United States Patent [19]

Goto

[11] 4,066,427
[45] Jan. 3, 1978

[54] BONDING METHOD USING A SOLDERING GLASS

[75] Inventor: Eizo Goto, Chigasaki, Japan

[73] Assignee: Tokyo Shibaura Electric Co., Ltd., Tokyo, Japan

[21] Appl. No.: 777,104

[22] Filed: Mar. 14, 1977

Related U.S. Application Data

[63] Continuation of Ser. No. 579,234, May 20, 1975, abandoned.

[30] Foreign Application Priority Data

May 20, 1974 Japan .................. 49-56416
July 11, 1974 Japan .................. 49-79427

[51] Int. Cl.² .............................. C03B 23/20
[52] U.S. Cl. ........................ 65/40; 29/25.13; 65/42; 65/43; 65/59 A; 65/59 B; 156/102; 156/106
[58] Field of Search ............ 65/40, 42, 43, 59 A, 65/59 B; 156/102, 106; 29/25.13

[56] References Cited

U.S. PATENT DOCUMENTS

| 2,181,240 | 11/1939 | Kimble | 65/42 X |
| 2,379,025 | 6/1945 | Miller | 65/59 X |
| 2,920,785 | 1/1960 | Veres | 65/43 X |
| 3,183,937 | 5/1965 | Earley et al. | 65/42 X |
| 3,424,568 | 1/1969 | Martin et al. | 65/59 A |
| 3,474,088 | 10/1969 | Mizuta | 65/59 A X |
| 3,519,409 | 7/1970 | Stutzman | 65/40 |
| 3,543,383 | 12/1970 | Freeman et al. | 65/59 A X |
| 3,544,294 | 12/1970 | Goto | 65/59 A X |
| 3,622,297 | 11/1971 | Johanson | 65/59 A X |
| 3,859,072 | 1/1975 | Fendley | 65/42 |

Primary Examiner—Robert L. Lindsay, Jr.
Attorney, Agent, or Firm—Finnegan, Henderson, Farabow & Garrett

[57] ABSTRACT

A method for bonding together a pair of members comprising positioning a layer of soldering glass between the pair of members, melting the glass, bonding the members into the molten glass and cooling the members. One of the members may be conductive with the soldering glass coated thereon, or the soldering glass may be coated on a conductive element which becomes bonded between the pair of members.

10 Claims, 15 Drawing Figures

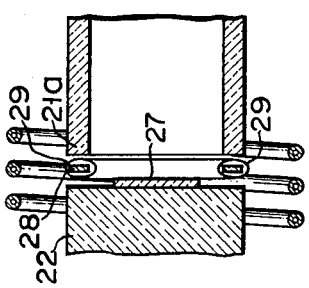
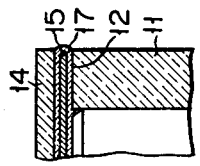
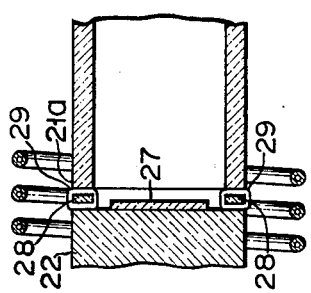
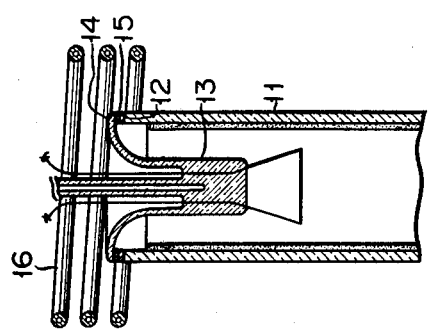
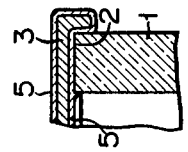
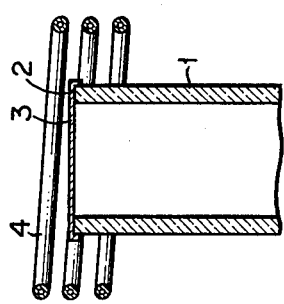
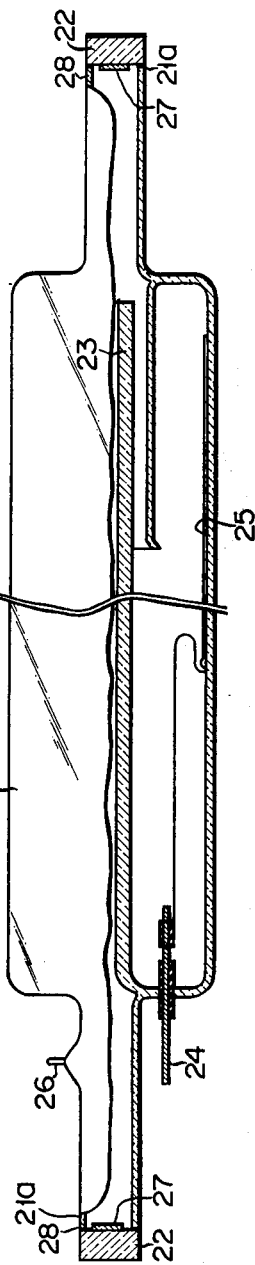

BONDING METHOD USING A SOLDERING GLASS

This is a continuation, of application Ser. No. 579,234, filed May 20, 1975 now abandoned.

BACKGROUND OF THE INVENTION

This invention relates to a method for bonding a nonconductive member with a conductive member, or for bonding one nonconductive member with another nonconductive member with a conductive member interposed therebetween, using a soldering glass, and a bonded or sealed structure obtained by said method.

Conventionally, as the method for bonding together glass sheets there is known a bonding method comprising sandwiching a metal sheet band between the glass sheets and heating the metal sheet band to effect bonding, such bonding methods being disclosed, for example, in U.S. Pat. Nos. 2,920,785 and 3,519,409. In these bonding methods, however, both nonconductive members desired to be mutually bonded are heated to the same high temperature. However, difficulties are presented in bonding where one of the nonconductive members can be damaged by a temperature as high as the bonding temperature.

Further, where a glass member and a metal member are bonded together, a method is well known which comprises heating the metal member utilizing a high frequency current, and locally melting by the resulting heat those portions of the glass member which are desired to be bonded to the metal. For example, in the sealing of an early model of a tubular fluorescent lamp, a metal cap is fitted against an end face of a tubular glass bulb, the cap having a thermal expansion coefficient approximate to that of the glass, and is heated up to a temperature of more than 1000° C using a high frequency induction-heater. The glass bulb end portion is locally melted by the resulting heat to be fused to the cap, and is cooled to complete the glass bonding. This bonding method is indeed simple but requires a high temperature for a long time to achieve the bonding, so that where bonding is carried out in the atmosphere a great deal of, cap oxidation takes place. In addition, a large amount of power is required. Difficulties are also presented in recovering and reusing the glass tube, cap, etc. since it is difficult to dismember the bonded structure.

Further, it has been conventionally regarded as impossible to attach a laser mirror to a plasma tube for use in a laser device by fusing the reflective surface of the laser mirror directly to the plasma tube. This is because the deposited surface of the laser mirror is not resistive to high temperature, the mirror substrate may be deformed. For these reasons, said attachment has been accomplished by using an organic bonding agent such as epoxy resin or the like, or where the sealing is conducted using a molten glass, the method of, for example, fitting a metal piece such as Kovar to the peripheral portion of the rear face of the mirror has been customarily carried out. But in the case where the organic bonding agent is used, the bonding life could be expected to have only a length of 1000 to 2000 hours at most, while in the case where molten glass is employed, the resulting sealed structure became complicated in construction, expensive and heavy. As a result the laser tube is likely to be distorted, and the laser device has its functional stability lowered.

SUMMARY OF THE INVENTION

An object of the invention is to provide a method for bonding a nonconductive member with a conductive member using soldering glass even though the nonconductive member may be damaged by a temperature lower than the bonding temperature, and for simplifying the bonding equipments and operations yet achieving a firm or strong bond, and which makes it possible to dismember the bonded structure and reuse the constituent elements.

Another object of the invention is to provide a method for bonding one nonconductive member with another with a conductive member interposed therebetween, using soldering glass.

Still another object of the invention is to provide a method for bonding a nonconductive member with a conductive member or for bonding one nonconductive member with another with a conductive member interposed therebetween, using soldering glass, which is capable of preventing the occurrence of cracks or leak at the bonded section.

A further object of the invention is to provide a bonded or sealed structure which is obtained by the bonding method of the invention.

A further object of the invention is to provide a laser tube to which a laser mirror is fitted in a sealed manner in accordance with the method of the invention.

This invention is characterized by bonding a nonconductive member with a conductive member or in bonding one nonconductive member with another with a conductive member interposed therebetween, a soldering glass being interposed between the nonconductive member and the conductive member, passing an electric current through the conductive member to heat the same, thereby melting said soldering glass, and gradually cooling and solidifying the molten soldering glass.

Further, this invention is characterized in that when, in the bonded or sealed structure obtained by the above-mentioned method, a conductive element extends outside the bonded structure, an organic bonding agent having a buffer action is applied to the conductive element adjacent this structure and the immediately surrounding surface of the structure for muffling the distortional stress to the soldering glass of any impact on the conductive element thus preventing cracks or leaks at the bonded section.

BRIEF DESCRIPTION OF THE DRAWINGS

FIG. 1 is a sectional view illustrating an example of the bonding method according to the invention;

FIG. 2 is an enlarged sectional view illustrating the main part of FIG. 1;

FIG. 3 is a sectional view illustrating another example of the bonding method according to the invention;

FIG. 4 is an enlarged sectional view illustrating the main part of FIG. 3;

FIG. 5 is a side view, partly broken, of a laser tube manufactured using the method of the invention;

FIGS. 6 and 7 are sectional views illustrating another example of the bonding method, according to the invention, particularly for bonding a laser mirror with the laser tube;

DETAILED DESCRIPTION OF THE INVENTION

Figure 8:
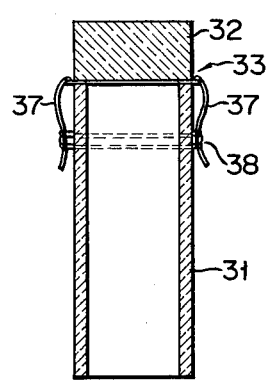
FIG. 8 is a sectional view illustrating another example of the bonding method, according to the invention, wherein a laser mirror is being bonded to a laser tube.

This invention will be more fully understood from the following Examples described with reference to the appended drawings.

In the bonding method of the invention there are two methods for passing an electric current through a conductive member to produce heat — one of which is by applying a high frequency voltage and the other of which is by directly passing an alternating current or direct current through the conductive member. Further, in this specification a nonconductive member is defined as a member made of nonconductive inorganic material such as glass, ceramics, silica glass, or various kinds of complexes including alumina-titanium carbide, mica glass or the like. A conductive member is defined as having conductivity and capable of being heated by passing an electric current therethrough, such as metal. In the case of using the high frequency induction-heating method, soft metal such as copper or aluminium is used, while in the case of passing the current through the member, a metal resistor such as an Fe-Ni alloy, Fe-Ni-Co alloy, molybdenum or platinum is used. On the other hand, soldering glass used in this invention is known soldering glass being generally known as a "low melting point-glass." This soldering glass is required, as a matter of course, to have a lower melting point than the and materials to be bonded together.

In the following Example 1, description is made of a method for bonding a nonconductive member with a conductive member, while using high frequency method for heating the conductive member.

EXAMPLE 1

FIG. 1 illustrates the method in accordance with the invention wherein a metal cap is bonded to the end face of a tubular bulb formed of nonconductive material, such as sapphire ceramic, whose bonded section is easily broken if cooled rapidly. In FIG. 1, the tubular ceramic bulb 1, having an end face 2 to be bonded is shown as having a metal cap 3 (to be described later) fitted thereon, the metal cap to be heated by an induction coil 4 of a high frequency induction-heater which is connected to a high frequency power source, which is not shown. The cap 3 is formed of a metal whose thermal expansion coefficient is approximate to that of the bulb 1. The cap 3 is formed into a dish configuration, and coated in advance with a soldering glass material 5 whose thermal expansion coefficient is approximate to that of the bulb 1 and whose melting point is much lower than that of the bulb 1 and the cap 3. The bonding is carried out as follows: The soldering glass 5 is heated by passing an electric current therethrough, the viscosity of the glass remaining at 100 poise or less, and the cap 3 is then dipped into and drawn out from the molten solution. As a result, a coating layer of the soldering glass 5 having a thickness of about 100 to 300 μ is formed on the surface of the cap 3. The cap 3 coated with the soldering glass 5 is fitted over the end face 2 of the bulb 1, and the induction coil 4 is placed around the resulting structure, and the power source is turned on. As a result of the induction current produced in the cap 3, the cap is heated by Joule heat, and the heated cap 3 causes the soldering glass 5 to be softened. When, subsequently, the cap 3 and the bulb 1 are pressed together, an induction current is produced also in the soldering glass 5, and the resulting Joule heat causes the temperature of the soldering glass 5 to be rapidly increased with the result that the soldering glass 5 has a viscosity of 50 to 100 poise which is optimum to fusion-bond. Since, at this time, the end face 2 of the bulb 1 is also heated by the heat of the soldering glass 5, the soldering glass is sufficiently fused to the end face of the tube. The details of this structure are shown enlarged in FIG. 2.

When, under such condition, the power source is turned off, the induction currents in the cap 3 and the soldering glass 5 are extinguished, so that the cap 3 is rapidly cooled and simultaneously the soldering glass 5 is cooled and solidified to provide a good airtight bonded structure.

In the bonded structure thus obtained, the soldering glass 5 substantially completely coheres to the bulb 1 under the condition wherein it is coated on the entire surface of the cap 3, so that the bonding is extremely firm or strong. Further, the melting point of the soldering glass 5 is lower than that of the bulb material, so that the current passage time can be rendered extremely short as compared with the previously mentioned prior art bonding method. Further, the temperature of the cap 3 is only increased to the fusion-bonding temperature of the soldering glass 5 and since the surface of the cap 3 is covered with the soldering glass 5, the cap 3 is neither oxidized nor thermally damaged. Further, when, as required, the cap 3 is heated by, for example, a burner to cause the soldering glass 5 again to be molten, the cap 3 can easily be dismembered from the bulb 1. Since this dismembered cap 3 has not been subjected to any damage or injury, it can be reused.

In the following Example 2, description is made of a method for bonding a nonconductive member with another conductive member with a conductive member interposed therebetween, which uses high frequency induction-heating.

EXAMPLE 2

FIG. 3 illustrates the method of the invention, wherein the end face of a fluorescent lamp bulb is closed by a flare stem mounted thereon. In FIG. 3, reference numeral 11 designates a tubular glass bulb coated with a fluorescent material, 12 the end face of the glass bulb 11 constituting a bulb face to be bonded, 13 the glass flare stem for closing the end face 12, 14 the flared portion of the stem 13, 15 a glass-bonding metal plate, as later described, which is interposed between the flared portion 14 and the end face 12, and 16 the induction coil of a high frequency induction-heater, which is connected to a high frequency power source, not shown. The glass bonding metal plate 15 is an annular member which is formed of soft metal such as copper having a thickness of 0.1 to 0.3 mm and having the corresponding outer and inner diameters of the end face 12. The upper and lower surfaces of the plate 15 are coated in advance with a soldering glass material 17 having a much lower melting point than the bulb 11 and flare stem 13, in the same manner as described in Example 1.

The bonding is carried out as follows. The glass bonding metal plate 15 is superposed upon the end face 12 of the bulb 11, and the flared portion 14 of the flare stem 13 is further superposed upon the metal plate 15, the stem 13 being exactly positioned. Next, the induction coil 16 is disposed around this superposed structure, and the power source is turned on. As a result, an induction current is produced in the metal plate 15, which is heated by the resulting Joule heat to cause the soldering glass 17 to be softened. Then, an induction current is produced also in the soldering glass 17, and due to the resulting Joule heat the soldering glass temperature is rapidly increased, so that the soldering glass has a viscosity of 50 to 100 poise which is optimum to the fusion-bond. The end face 12 of the bulb 11 and the surface of the flared portion of the stem 13 are locally heated by the soldering glass heat so that the soldering glass 17 is sufficiently fused to the end face 12 and the flared portion 14. The details of this structure are shown enlarged in FIG. 4.

When, under such condition, the power source is turned off, the superposed structure is rapidly cooled and simultaneously the soldering glass 17 is cooled and solidified to provide a good airtight bonded structure. It is preferred from the standpoint of protecting the fluorescent material that the flared portion 14 and the metal plate 15 be heated and fused and thereafter the resulting bonded unit be further bonded with the bulb 11. In the bonded structure thus obtained, the bonding force is extremely firm or strong and yet the current passage time is short. Accordingly, this bonding method only requires a small amount of power dissipation. As in Example 1, the soldering glass-bonding can be repeatedly carried out through reheating.

Further, in this Example, the bulb 11 is a nonconductive member and the metal plate 15 is a conductive member, and this metal plate 15 and the flare stem 13 as another nonconductive member are superposed, one upon another through the soldering glass material 17 to provide a three-layer structure, so that not only a simultaneous bonding is possible and the bonding operation is easily performed, but only a small amount of power dissipation is required. Since the heating time is short, there is no fear of causing a damage to the bulb 11 and stem 13. Further, in this Example, the metal plate 15 is formed of soft metal, so that even where there is a difference in thermal expansion coefficient between the glass constituting the bulb 11 and the glass constituting the stem 13, any distortion resulting from this difference is compensated for by the metal plate 15 to prevent cracks from taking place at the bonded section.

The following Example 3 shows the method of invention for the attachment of a laser mirror to a laser tube, and wherein respective nonconductive members are disposed with a conductive member interposed therebetween and spaced from this conductive member, and the bonding between the members is accomplished after the soldering glass is molten.

EXAMPLE 3

FIG. 5 illustrates a laser tube as a whole, whose construction is schematically described as follows. The laser tube comprises a borosilicic acid glass plasma tube 21 into which a gas is sealed, borosilicic acid glass laser mirrors 22 at both ends of the plasma tube 21, a capillary tube 23 disposed at the central position of the plasma tube 21 along the longitudinal direction thereof, a cathode member 24, a cooled cathode member 25 and an anode member 26. At this time a dielectric multi-layer film 27 consisting of magnesium fluoride ($MgF_2$), zinc sulfide (ZnS) or the like is already deposited on the inner side surfaces of the laser mirrors 22; and that this multi-layer film 27 is damaged by a temperature of 500° to 550° C.

For bonding the laser mirror 22 with an end portion 21a of the laser tube 21, an annular conductive member 28, formed of, for example, copper or aluminium and being in conformity in size with the cross section of the end portion 21a, is dipped in a molten soldering glass and is thereby coated as a whole with the soldering glass 29. Subsequently, as illustrated in FIG. 6, the laser mirror 22 and the end portion 21a of the laser tube are so arranged as to sandwich a conductive member 28 therebetween and to be spaced respectively from the conductive member 28. This arrangement is preheated nearby to the transition point of the soldering glass 29. Thereafter, as illustrated in FIG. 7, the conducting member 28 is heated further by the high frequency induction-heating to bring the soldering glass into a molten state. Thereafter, the respective elements constituting said arrangement are pressed together in an integral bond. After this integral bond, the high frequency induction-heating is stopped before the multi-layer film 27 is subjected, due to the resulting heat, to destruction or property deterioration. The heating lasts, (for example, 3 to 5 seconds). Then, the resulting bonded structure is gradually cooled to complete the whole bonding.

In this embodiment, the fusion bond between the conductive member 28 and the end portion 21a of the laser tube may be performed in advance of carrying out the fusion bond between the conductive member 28 and the laser mirror 22. Further, in this embodiment, though the conductive member 28 and the soldering glass material 29 were heated up to a temperature of about 650° to 700° C, the deposited film 27 was kept at a temperature of less than 500° C. As a result, the laser mirror 22, as bonded, was subjected to neither damage nor property deterioration, and further the glass substrate was subjected to little distortion, so that the laser tube was maintained at a sufficient degree of precision.

The next Example 4 also shows a method of the invention wherein a laser mirror is attached to a laser tube, similarly to Example 3. But in the following example, heating of a conductive member is carried out by directly passing an electric current through the conductive member.

EXAMPLE 4

Figure 10:
FIG. 10 is an enlarged sectional view of FIG. 8.

In FIG. 8, reference numeral 31 designates a plasma tube formed of borosilicic acid glass, and 32 a mirror formed of borosilicic acid glass and being attached to the end portion of the plasma tube 31. One surface of the mirror 32 constitutes a mirror surface consisting of a deposited film of magnesium fluoride ($MgF_2$) and zinc sulfide (ZnS). The fusion bond between a nonconductive member and another nonconductive member, such as between the plasma tube 31 and the mirror 32, is carried out by interposing a conductive member 33 as shown enlarged in FIG. 10 between the respective faces of the nonconductive members to be bonded and heating the conductive member 33 by passing current therethrough. The conductive member 33 is formed as an annular resistance-heat generator 34 having a configuration substantially in conformity with that of the respective faces to be bonded and prepared by coating it with a soldering glass 35. A pair of electrodes 36, 36 are provided for the heat generator 34 at positions substantially opposite from each other, and a pair of lead wires 37, 37 are connected to the pair of electrodes, respectively. The soldering glass 35 is so coated as to have a thickness of about 100 to 300μ.

Figure 9:
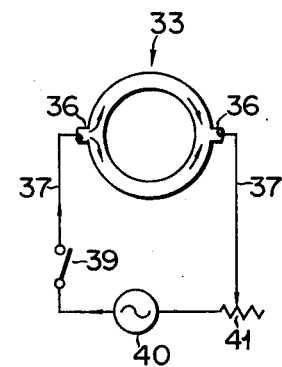
FIG. 9 is a circuit diagram illustrating the electrical connections in the example of FIG. 8.

The conductive member 33, i.e., the generator 34 with the soldering glass 35 coated thereon, is disposed on that portion of the plasma tube 31 which is desired to be bonded, and the leads 37, 37 are held in place by being bundled with a heat-insulating string, for example, asbestos string 38 so as not to contact the plasma tube 31, and one lead 37, as illustrated in FIG. 9, is connected to a power source 40 through a switch 39, while the other lead 37 is connected to the power source 40 through a variable resistor 41. While the conductive member 33 is being pressed between the nonconductive members 31 and 32, i.e., the tube and mirror, the heat generator 34 is heated to Joule heat, which causes the soldering glass 35 to be softened and rendered conductive. As a result, a current flows also in the soldering glass 35, which is rapidly decreased in viscosity and spreads over the faces to be bonded. Under this condition, the flat mirror 32 is bonded to the tube 31 through the conductive member 33. When the current flowing in the resistance-heat generator 34 is stopped, the soldering glass 35 starts to cool and is solidified to provide a good airtight bonded structure.

Since, the heat generator 34 and the soldering glass 35 are only locally heated and for only a short time by utilizing the Joule heat resulting from the current flow, the fusion-bond can be achieved without causing any damage to the members. In this case, the parallelism between the mirror surface and the bond face of the plasma tube is maintained with extremely high precision due to the surface tension of the molten soldering glass, to permit a self-positioning. To attain this self-positioning, the plasma tube 31 is preferred to be placed upon the mirror 32, that is, with the mirror located below the tube.

The plasma tube 31 in Example 4 maybe a borosilicic acid glass tube 11 mm in outer diameter and 8 mm in inner diameter. The mirror 32 was prepared by forming a mirror surface on one surface of a block member which is 11 mm in outer diameter and 5 mm in height and also formed of borosilicic acid glass, the mirror surface consisting of a deposited film made of magnesium fluoride and zinc sulfide. As the resistance-heat generator 34 there was used an Fe-Ni-Co alloy member having the dimensions of 12 mm in outer diameter, 0.2 mm in thickness and 2 mm in ring width. A pair of Kovar plates each having a thickness of 0.3 mm and an area of 5 mm$^2$ were welded to the outer peripheral edge of the generator 34 as the electrodes 36.

As the soldering glass material 35 there was used a solder glass consisting of $B_2O_2$, $ZnO$ and $V_5O_5$. Said solder glass was molten in a dip oven to prepare a fluid mass having a viscosity of less than 100 poises. The heat generator 34 was dipped in this fluid mass to be coated with a solder glass film having a thickness of 100 to 300μ.

The mirror attaching operation was performed as follows. The resistance-heat generator 34 having the electrodes 36, 36 attached thereto and coated with the soldering glass 35 was first superposed on the end face of the plasma tube 31 and then the mirror 32 was superposed on the heat generator 34, and the members thus arranged were lightly bonded with each other while being held in place as a whole. Next, a laser light was radiated onto the mirror surface from the opposite side of the plasma tube 31 and adjustment was so made, by checking the light reflected from the mirror 32, that the mirror surface became perpendicular to the plasma tube axis. After the plasma tube 31 and the mirror 32 were preheated up to a temperature of about of 450° C, a voltage of several volts was applied between the electrodes 36, 36 thereby heating the soldering glass 35 to a temperature of 800° to 900° C. After about 20 seconds to complete the fusion-bond the power source was turned off. As a result, a firm or strong airtight bond was achieved without damaging the deposited film of the mirror 32.

In this example, the mirror 32 is bonded to the plasma tube 31 which is coated with the soldering glass 35, alternatively, the plasma tube, resistance-heat generator and mirror may be fusion-bonded by the current passage-heating while they are superposed one upon another and lightly pressed together.

Further, the fusion-bonding of the mirror 32 may be carried out after an assembled structure consisting of the heat generator 34 and the plasma tube 31 is dipped in the molten glass. It should be noted that the action of the heat generator in this case is intended to maintain the soldering glass 35 on the plasma tube in a molten condition during the bonding step. Also, in this example, the conductive member is described as being formed into an annular configuration, but is not limited thereto. The generator 34 may be discshaped, elliptical, rectangular, or of any other configuration if capable of attaining a uniform heat generation. Further, the electrodes are not limited to one pair but may be provided in a number of 3, or 4 or more. Further, the nonconductive member may be the one formed of silica glass, ceramics or micalex as well as of soldering glass.

Where, as in this example, the method for bonding one nonconductive member with another nonconducting member by directly passing a current through a conductive member interposed between the nonconductive members is utilized, there is no necessity for using such a high frequency induction-heater, as required in Examples 1 to 3. Thus, the operation equipment is simple, and the bonding position-adjustment for the members to be bonded is easy since jigs need not be heated.

In the preceding examples, since the conductive member is coated entirely with the soldering glass and is not exposed to the interior of the tube or bulb, the conductive member is neither oxidized by interior atmosphere nor evolves an impurity gas. Conversely, the soldering glass may be coated on the faces of the nonconductive members which are to be bonded to the conductive member. Furthermore, alternatively, molten soldering glass need not be coated on the conductive or the nonconductive member. For example, a fine soldering glass powder may be applied in advance to the faces to be bonded. The soldering glass has only to exist between the conductive member and the nonconductive member.

This invention permits a multi-layer structure wherein one nonconductive member is interposed between a pair of conductive members. The point is that so long as the soldering glass exists between each conductive member and the adjacent conductive member, these members may be combined in any form and superposed one upon another in any number.

As above described in detail, this invention permits the nonconductive member to be bonded with the conductive member by interposing the soldering glass between the nonconductive member and the conductive member and passing a current through the latter member to heat the same, thereby to melt the soldering glass by gradually solidifying this molten soldering glass. Namely, this invention provides a method for bonding a nonconductive member with a conductive member, or for bonding together nonconductive members with a conductive member interposed therebetween, using a soldering glass, which is capable of simplifying the bonding operation, and achieving a firm bond, and yet makes it possible to dismember the bonded structure and reuse the resulting constituent elements.

In some examples of the bonded or sealed structure obtained by the bonding method of the invention, a portion of the conductive member incorporated therein extends exteriorly of the bonded structure. For instance, in Example 4, the leads 37 connected to the resistance-heat generator 34 extend exteriorly of the bonded structure. These leads become unnecessary upon completion of glass soldering, and therefore are cut off at the heat generator. The impacts, distortions, etc. resulting from this cutting-off, however, are transmitted to the soldering glass and may possibly cause cracks and leaks in the soldering glass. For removing this drawback, a resin film having a buffer action can be applied to the foot or base section of the conductive member element extending from the bonded structure. The following examples utilize a resin film applied to the laser tube of Example 4.

Example 5

Figure 11:
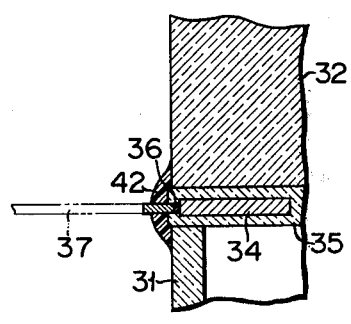
FIGS. 11 and 12 are sectional views related to a reinforcing treatment for the bonded section of the laser tube obtained using the method of the invention and illustrating steps of the reinforcing treatment.

FIG. 11 is an enlarged view of the bonded portion of FIG. 8. Upon completion of the bonding step of Example 4, the leads 37, 37 become unnecessary. Accordingly, the leads extending from the electrodes 36, 36 should be cut off. Prior to the cutting-off, however, as illustrated in FIG. 11, a film 42 of an organic bonding agent having a buffer action and yet a considerably high adhesivity, such as Araldite, is applied over the foot sections of the leads 37 at their connections with the electrodes 36 and over a region covering a portion of the plasma tube 31 and a portion of the miror 32. After formation of such film 42, the lead 37 is cut off at its foot section. If at this time, some distortions, stress or impacts are transmitted to the lead 37, these are absorbed and lessened by said film 42 and are not transmitted to the soldering glass 35. As a result, cracks rarely appear in the soldering glass 35, and are extremely small if they occur. Accordingly, no leak develops.

Figure 12:
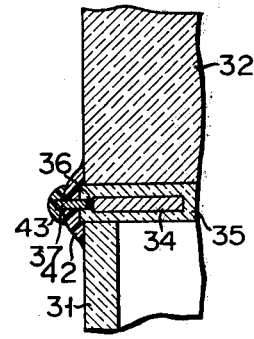

Another film 43 made of the same organic bonding agent maybe further applied to the exposed surface of cut-off lead 37, as shown in FIG. 12. Thus, any impact will not be directly transmitted to the electrode 36 and, since the bonding agent has an insulating property, the bonded structure will be more safe to handle.

This step for reinforcing the bonded section of the laser tube obtained using the bonding method of the invention is not restricted to Example 5. The additional step is applicable if the nonconductive member is made, for example, of ceramic material. Further, what is sealed to this nonconductive member is not limited to the lead wire, but may be, for example, a metal plate. The point is that if only a metal conductor is sealed to a nonconductive member through the soldering glass and partially extending exteriorly of the bonded structure, this invention can be put into practice.

In the following example, this reinforcing step is applied to a flat fluorescent lamp.

EXAMPLE 6

Figure 13:
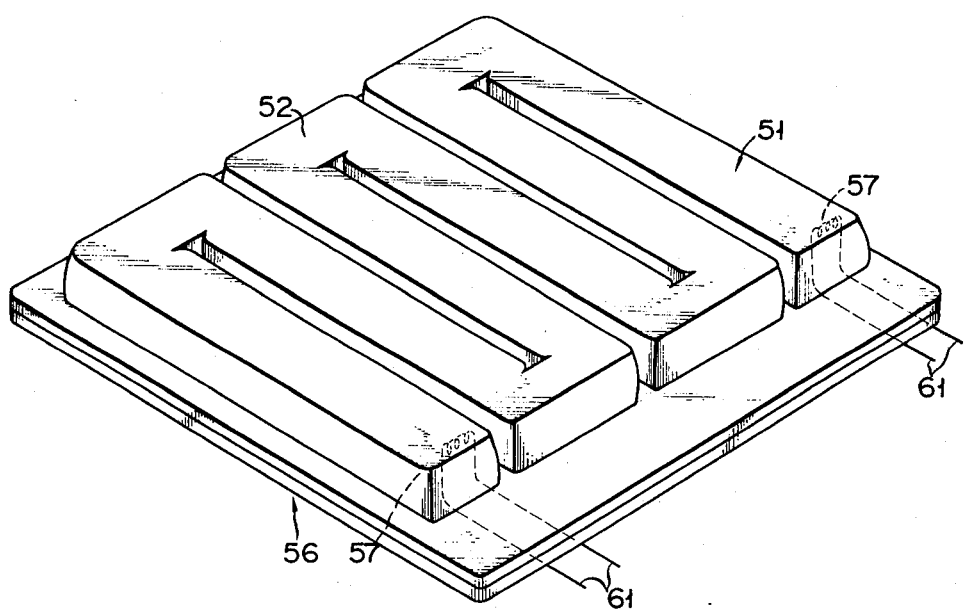
FIGS. 13 and 15 are views in illustrating the reinforcing treatment of FIGS. 11 and 12 as applied to a flat fluorescent lamp.

FIG. 13 illustrates a flat fluorescent lamp wherein a glass back plate 51 and a glass face plate 56 are sealed to each other at their peripheral edge portions. The back plate 51 has a zigzag discharge path 52 and a fluorescent material layer 53 is applied to the inner surfaces of the discharge path 52. The face plate 56 has an ornamental pattern portion 54 on its front face corresponding to the back plate 51 and a fluorescent material layer 55 is applied to the inner surface of the ornamental pattern portion 54. The lamp is further provided with a pair of electrodes 57, 57 disposed, respectively, at both ends of the discharge path 52. The electrodes 57, 57 are connected to a power source (not shown) through a pair of leads 58, 58, respectively. Each lead takes a so-called "triple part"-form, and consists of serially connected interior lead portion 59, sealed lead portion 60 and exterior lead portion 61. The interior lead portion 59 supports the electrode 57 within the lamp, the lead portion 60 being sealed between the respective peripheral edge portions of the back plate 51 and the face plate 56 through the soldering glass 62. The exterior lead portion 61 may be provided with a connective device, not shown, for connection to a power source.

Figure 14:
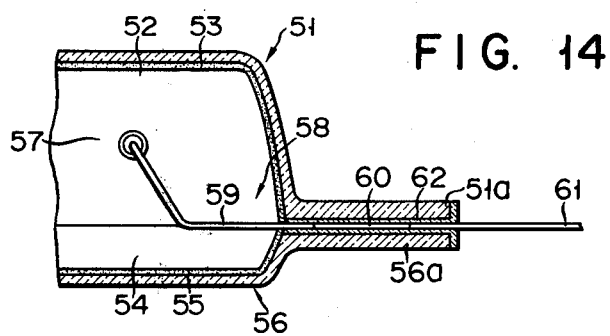
Figure 15:
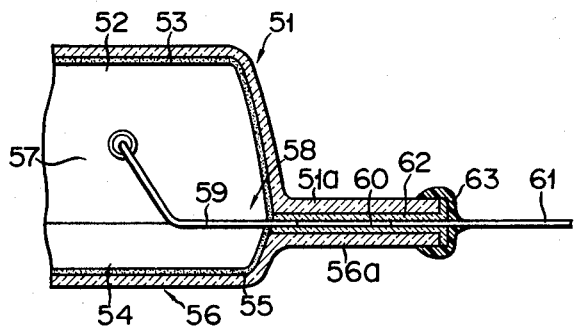

Once the sealing has been made between the back plate 51 and the face plate 56, the sealed lead portion 60 of the "triple part" lead 58 is disposed at a prescribed position between the peripheral edge portion 51a of the back plate 51 and the peripheral edge portion 56a of the face plate 56, and is sandwiched therebetween. Under this condition, these peripheral edge portions 51a and 56a are dipped in molten soldering glass 62 thereby to perform a so-called dip-sealing. As a result, the molten soldering glass 62 flows due to the capillarity, into the interspace between the peripheral edge portions 51a and 56a. Accordingly, when these peripheral edge portions 51a and 56a are withdrawn from the molten soldering glass 62 and cooled and solidified, they are sealed to each other and the sealed lead portion 60 is also sealed simultaneously as illustrated in FIG. 14. The exterior lead portion 61 is connected to the sealed lead portion 60 sealed in the above-mentioned manner. Here, an organic bonding agent 63 is applied, as illustrated in FIG. 15, to the foot section of this exterior lead portion 61 and over a region covering the adjacent peripheral edge portions 51a, 56a, and the exposed surface of the soldering glass 62. The organic bonding agent has a buffer action and yet an appreciably high adhesivity, such as Araldite (trade name).

Even if, after such application of the bonding agent 63, the for example, a connective device any stress or distortions will never be transmitted directly to the soldering glass 62 but only to the bonding agent 63. Since, however, the agent 63 has a buffer action, such stress or distortions are absorbed into the agent 63, which prevents cracks from occurring in the soldering glass 62 and accordingly prevents occurrence of leak.

The method described in Examples 5 and 6 is a glass sealing and, reinforcing step comprising seal-fusing a metal conductor to a seal member consisting of glass or ceramics which is to be sealed, an element of the metal conductor extending exteriorly of the sealed section of the seal member, and applying to the foot section of the extending element of the metal conductor an organic bonding agent having a buffer action. According to this step, therefore, even if the metal conductor receives an external force, i.e., a stress or impacts through, for example, bending or cutting off its exteriorly extending portion, such external force is absorbed and lessened by the bonding agent and not directly transmitted to the soldering glass. As a result, this additional step can help eliminate the inconvenience in which crack-forming takes place in the soldering glass and can thus prevent occurrence of leak.

What is claimed is:

1. A method for bonding two nonconductive members made of glass or ceramic material, one of which includes an element made of a heat-fragile substance, comprising interposing a metal member coated with soldering glass between the nonconductive members, said metal member being out of contact with at least the nonconductive member including the heat-fragile element, passing an electric current through the metal member to heat the same to a temperature which is higher than the temperature damaging to the heat-fragile element of the nonconductive member thereby to melt the soldering glass, pressing the metal and nonconductive members together with the molten soldering glass therebetween cooling these members before said heat-fragile element is heated by the heat resulting from the current passing through the metal member to such temperature that it is damaged or has its properties substantially deteriorated.

2. A method according to claim 1, comprising directly passing an electric current through the metal member.

3. A method according to claim 1 comprising passing a high frequency induction current through the metal member.

4. A method according to claim 1, wherein said element made of a heat-fragile substance is a fluorescent material.

5. A method according to claim 2, wherein the metal member comprises a ring-like metal sheet, a pair of mutually opposite electrode end terminals formed at the outer peripheral edge portion of said metal sheet, and wherein a resistance heat current is allowed to flow from said electrode end terminals into said metal sheet.

6. A method according to claim 1, wherein bonding is performed under the condition wherein the bonding temperature of the soldering glass is kept higher than the temperature damaging to the heat-fragile element of the nonconductive member.

7. A method according to claim 1, wherein said element made of a heat-fragile substance is a multi-layer film for a laser mirror.

8. A method according to claim 2 wherein at least one metal element joined with said metal member extends exteriorly of said nonconductive members and wherein said method includes coating the portion of said exteriorly extending element adjacent said metal members with a film of organic bonding agent having a buffer action for preventing cleavage or breakage of the nonconductive members during subsequent cutting of the metal element.

9. A method according to claim 8 wherein the step of coating includes covering the surfaces of said nonconductive members and said soldering glass adjacent said exteriorly extending element.

10. A method according to claim 9 including the additional steps of cutting off said exteriorly extending element and placing a film of the organic bonding agent over the surface exposed by cutting off said extending element.

* * * * *